United States Patent [19]
Burrough

[11] 4,396,150
[45] Aug. 2, 1983

[54] SOLAR CONTROLLED IRRIGATION SYSTEM

[76] Inventor: Harry Burrough, P.O. Box 371, Piedra, Calif. 93649

[21] Appl. No.: 318,123

[22] Filed: Nov. 4, 1981

[51] Int. Cl.³ ............................................. A01G 27/00
[52] U.S. Cl. .................................... 239/75; 239/510; 239/215
[58] Field of Search ............... 250/212, 215; 137/78.2, 137/78.5, 79, 80; 47/48.5; 239/63, 64, 67, 75, 510, 542

[56] References Cited

U.S. PATENT DOCUMENTS

| 2,123,425 | 7/1938 | Kelley | 239/510 |
| 2,524,796 | 10/1950 | Higgins | 239/75 X |
| 2,928,606 | 3/1960 | Lee | 239/67 |
| 3,270,460 | 9/1966 | Wild | 239/63 X |
| 3,313,939 | 4/1967 | Spencer | 239/64 X |
| 3,840,209 | 10/1974 | James | 239/542 X |
| 4,304,528 | 12/1981 | Jordan | 137/78.2 X |

FOREIGN PATENT DOCUMENTS

| 822566 | 10/1959 | United Kingdom | 137/78.2 |
| 1241325 | 8/1971 | United Kingdom | 239/63 |

Primary Examiner—Andres Kashnikow
Attorney, Agent, or Firm—Allen A. Dicke, Jr.

[57] ABSTRACT

System for the supplying of water for the irrigation of plants is controlled by both solar radiance and ambient temperature so that water is supplied to the irrigated plants as a better function of their needs.

8 Claims, 3 Drawing Figures

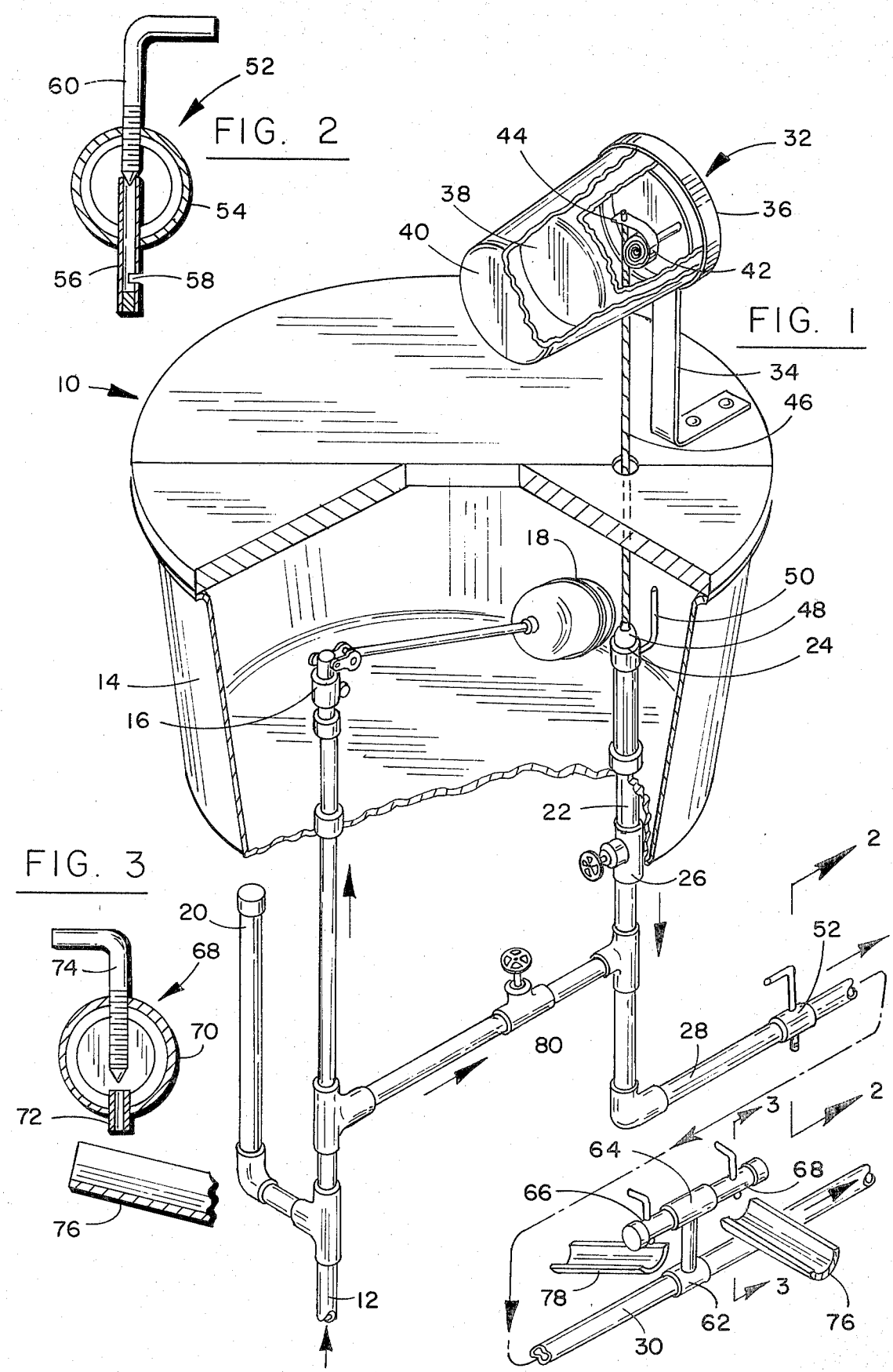

SOLAR CONTROLLED IRRIGATION SYSTEM

BACKGROUND OF THE INVENTION

This invention is directed to an irrigation system for the irrigation of growing plants and particularly such an irrigation system wherein the water flow is controlled as a function of both solar radiation and ambient temperature.

Many areas of the United States do not have natural rainfall which occurs sufficiently often that succesful gardening and farming can be achieved. Such areas require irrigation in the form of provision of water to the plants as a function of their needs. In those areas of the country where irrigation is required, quite often the air is clear so that solar radiance is substantial. Such solar radiance acting upon the dark leaves of the plant causes high leaf temperature and resultant high transpiration rates. In addition, the high ambient temperatures occasioned by the high solar radiance, and other weather factors, cause high transpiration rates. Thus, the quantity of irrigation water required by the plants is a function of both solar radiance and ambient temperature, and probably other factors. There is need for a solar controlled system for the management of irrigation water flow to conserve water, prevent overwatering, and to provide adequate watering, adjusted principally in accordance with solar radiance and also in accordance with ambient temperature.

SUMMARY OF THE INVENTION

In order to aid in the understanding of this invention, it can be stated in essentially summary form that it is directed to a solar controlled irrigation system which has a temperature sensor within a glass enclosure so that the sensed temperature is a function of solar radiance. The temperature sensor is connected to a water flow control valve that permits the flow of irrigation water to devices which distribute the irrigation water to the plants.

It is, thus, an object of this invention to provide a solar controlled irrigation system which controls the flow of irrigation water to plants as a function of solar radiance. It is another object of this invention to provide such an irrigation system wherein the irrigation flow controller is also controlled as a function of ambient temperature. It is a further object to provide an irrigation system for the controlling of irrigation water which is automatic in nature so that irrigation water flow is continuously varied in accordance with the variation in solar radiance.

Other objects and advantages of this invention will become apparent from a study of the following portion of the specification, the claims and the attached drawings.

BRIEF DESCRIPTION OF THE DRAWINGS

FIG. 1 is a perspective view, with parts broken away and parts taken in section, of the solar controlled irrigation system in accordance with this invention.

FIG. 2 is an enlarged section through an irrigation head, as seen generally along the line 2—2 of FIG. 1.

FIG. 3 is an enlarged sectional view through another irrigation head, as seen generally along the line 3—3 of FIG. 1.

DESCRIPTION OF THE PREFERRED EMBODIMENT

The solar controlled irrigation system of this invention is generally indicated at 10 in FIG. 1. Water is supplied under pressure to inlet line 12. Inlet line 12 discharges water into reservoir 14 through inlet valve 16. Inlet valve 16 is controlled by float 18 so as to maintain a substantially constant water level within reservoir 14. Air trap stub 20 on inlet line 12 damps the pressure surges in the inlet line to prevent water hammer.

Outlet line 22 has an upwardly directed circular valve seat 24 positioned below the normal water level in reservoir 14. If there was no obstruction, water in the reservoir would flow freely down outlet line 22, through shutoff valve 26 to distribution pipe 28. Distribution pipe 30 is a continuation of distribution pipe 28 and is connected thereto.

The flow of irrigation water through valve seat 24 is controlled by sensor 32. Sensor 32 is principally a sensor of solar radiance, but is also responsive to ambient temperature. Sensor 32 is mounted on reservoir 14 by mounting bracket 34. Mounting bracket 34 carries base 36. Inner enclosure 38 and outer enclosure 40 are both removably mounted on base 36. Each of the enclosures 38 and 40 is a cylindrical enclosure or the like made of a material which is substantially transparent to solar radiation and is substantially opaque to infrared radiation. A suitable material is glass, and enclosures in the shape of glass jars are illustrated. The enclosures have an air space therebetween to reduce convection cooling of the inner enclosure. Most of the heat loss from the inner enclosure is by radiation and convection of the base 36 to the surroundings. Heating of the volume inside inner enclosure 38 is thus a function of solar radiation, and the cooling of that space is partly a function of ambient temperature, with more cooling occuring with lower ambient temperature. The temperature within inner enclosure 38 is thus a function of both the solar radiation and the ambient temperature, with the design arranged so that the solar radiation has a greater effect on the interior temperature than the external temperature.

Temperature sensor 42, in the form of a bimetallic coil, is positioned within inner enclosure 38 and has its central rod mounted on base 36. The outer end 44 moves up with increasing temperature around coil 42 and goes down with decreasing temperature. Connector 46 extends down through openings in both of the enclosures 38 and 40, down into reservoir 14. Connector 46 carries valve ball 48 on its lower end. Valve ball 48 cooperates with valve seat 24 to control the outflow of irrigation water from reservoir 14. Valve ball 48 is formed as a hollow ball so that it has an average density of approximately 1, or is formed of material (such as foam material) which has an average density of approximately 1 so that the ball has neutral buoyancy in the water in the reservoir. This neutral buoyancy is to minimize the force required by the sensor 32 to increase flow through valve seat 24 down outlet tube 22. Furthermore, in order to decrease the static head of water holding the valve ball onto valve seat 24, float 18 controls the level in reservoir 14 such that it is normally about an inch above valve seat 24 for a ¾ inch diameter valve seat. If it was desired to have a higher head on the outlet flow control valve comprised of valve ball 48 and valve seat 24, a balance type of valve could be used. Vacuum breaker 50 extends from outlet tube 22 to a position above the water level in order to prevent vacuum in the outlet tube from interfering with operation of the outlet flow control valve.

Irrigation water distribution pipes 28 and 30 are thus supplied with water from reservoir in accordance with the temperature within inner enclosure 38, which is a function of energy received from solar radiation less the energy lost due to convection, conduction and radiation. The water in the distribution pipe is delivered to plants through various types of irrigation water delivery heads. Water delivery head 52 is illustrated in FIGS. 1 and 2. Body 54 has water pressure on the interior thereof, and outlet tube 56 extends therein. Outlet tube 56 is plugged at its bottom and has side spray slot 58. In addition, needle 60 is threaded into body 54 and faces the open inlet of outlet tube 56. Needle 60 has an L-shaped handle so that it may be rotated to adjust its position with respect to the outlet tube to control the water outflow from the outlet tube in side spray slot 58. Such water delivery heads 52 may be positioned where desired to deliver water to plants.

T 62 in distribution pipe 30 carries T 64. T 64, in turn, carries water delivery heads 66 and 68. Head 68 is shown in further detail in FIG. 3. Head 68 has a body 70 which carries outlet tube 72 therethrough. Needle 74 is threaded through body 70 and is positioned in conjunction with the inlet end of outlet tube 72. An L-shaped handle on needle 74 is provided to conveniently manually turn the needle to adjust its conjunction with outlet tube 72. Body 70 is supplied with irrigation water so that the adjustment of the needle controls the water outflow through outlet tube 72. In order to direct the water onto an adjacent plant, trough 76 is positioned below outlet tube 72. By the use of such troughs, the location of water delivery can be controlled without moving the delivery heads. A similar trough 78 is positioned with respect to head 66.

In normal use, the water flowing through the distribution pipes and out the water delivery heads is a function of the solar radiance, as described above. The allocation of this water between the several delivery heads and several corresponding plants is accomplished by adjustment of the needle valves in the delivery heads. Should additional water be required, bypass valve 80 delivers pressure water form inlet line 12 directly into distribution pipe 28. In such a case, shutoff valve 26 is closed to prevent reverse flow in outlet line 22. Instead of shutoff valve 26, a check valve could be employed. In addition to supplying additional water, bypass valve 80 also has a function of supplying water under greater pressure to the delivery heads. Opening bypass valve 80 assists in blowing dirt out of the delivery heads to reduce maintenance and reduce the need for adjustment of the individual needle valves. Thus, opening of bypass valve on a periodic, regular basis to blow the contamination out of the delivery head is helpful. The solar controlled irrigation system 10 thus conserves the amount of water required for irrigation by supplying water principally as a function of solar radiation.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A solar controlled irrigation system comprising:
   an inlet for supply of irrigation water;
   a reservoir, said inlet being connected to said reservoir to supply water to said reservoir;
   an outlet for the delivery of irrigation water, said outlet being an outlet line connected to said reservoir to receive water from said reservoir;
   a flow control valve connected between said reservoir and said outlet to control outflow from said reservoir into said outlet line;
   solar sensing means connected to said flow control valve for controlling the flow of irrigation water through said flow control valve substantially as a function of solar radiation onto said solar sensing means, said sensing means comprising an enclosure formed of a material which substantially passes solar radiation and is substantially opaque to infrared radiation and a temperature sensor within said enclosure so that the temperature sensed by said temperature sensor is substantially a function of solar radiation, said temperature sensor providing mechanical motion upon the sensing of solar radiation, said temperature sensor being connected to said flow control valve so that the mechanical motion of said temperature sensor physically moves said valve to control outflow of water from said reservoir into said outlet to control the delivery of irrigation water.

2. The solar controlled irrigation system of claim 1 wherein said enclosure is an inner enclosure and there is a further, outer enclosure also substantially transmissive to solar radiation and substantially opaque to infrared radiation, said second enclosure enclosing said first enclosure.

3. The solar controlled irrigation system of claim 1 wherein said outlet flow control valve comprises a valve ball at the top of said outlet line, said sensor means being connected to said valve ball to raise said valve ball away from said oulet line when solar radiation is sensed.

4. The solar controlled irrigation system of claim 3 wherein said temperature sensor is a coiled bimetallic temperature sensor positioned within said enclosure and a flexible connector is engaged between said bimetallic temperature sensor and said valve ball so that upon sensing of said temperature, said temperature sensor controls said valve ball.

5. The solar controlled irrigation system of claim 1 wherein there is an inlet valve on said inlet line and a float connected to said inlet valve, said float being responsive to irrigation water level in said reservoir so that the head of water over said outlet flow control valve is substantially constant.

6. The solar controlled irrigation system of claim 1 wherein said temperature sensor is a coiled bimetallic temperature sensor positioned within said enclosure, said bimetallic temperature sensor being directly connected to actuate said flow control valve.

7. A solar controlled irrigation system comprising:
   an inlet for supply of irrigation water;
   a reservoir, said inlet being connected to said reservoir to supply water to said reservoir;
   an outlet for the delivery of irrigation water, said outlet being an outlet line connected to said reservoir to receive water from said reservoir;
   a flow control valve connected between said reservoir and said outlet to control outflow from said reservoir into said outlet line;

lar sensing means connected to said flow control valve for controlling the flow of irrigation water through said flow control valve substantially as a function of solar radiation onto said solar sensing means, said sensing means comprising an enclosure formed of a material which substantially passes solar radiation and is substantially opaque to infrared radiation and a temperature sensor within said enclosure so that the temperature sensed by said temperature sensor is substantially a function of solar radiation, said temperature sensor providing mechanical motion upon the sensing of solar radiation, said temperature sensor being connected to said flow control valve so that the mechanical motion of said temperature sensor physically moves said valve to control outflow of water from said reservoir into said outlet to control the delivery of irrigation water; and a distribution pipe connected to said outlet pipe and a delivery head connected to said distribution pipe, said delivery head comprising a body, an outlet tube from said body and a needle threadedly engaged in said body and associated with said outlet tube so that adjustment of said needle adjusts the opening between said needle and said outlet tube to control irrigation water outlet flow through said outlet tube.

8. The solar controlled irrigation system of claim 7 wherein a trough is positioned adjacent said outlet tube of said delivery head to receive water therefrom and direct irrigation water to an adjacent plant.

* * * * *